Nov. 25, 1969            M. POSSATI            3,480,861
DEVICE FOR INDICATING THE VALUE OF A MAGNITUDE SUCH
AS AN ELECTRIC SIGNAL ON A VISIBLE SCALE OR DIAL
Filed Oct. 27, 1966
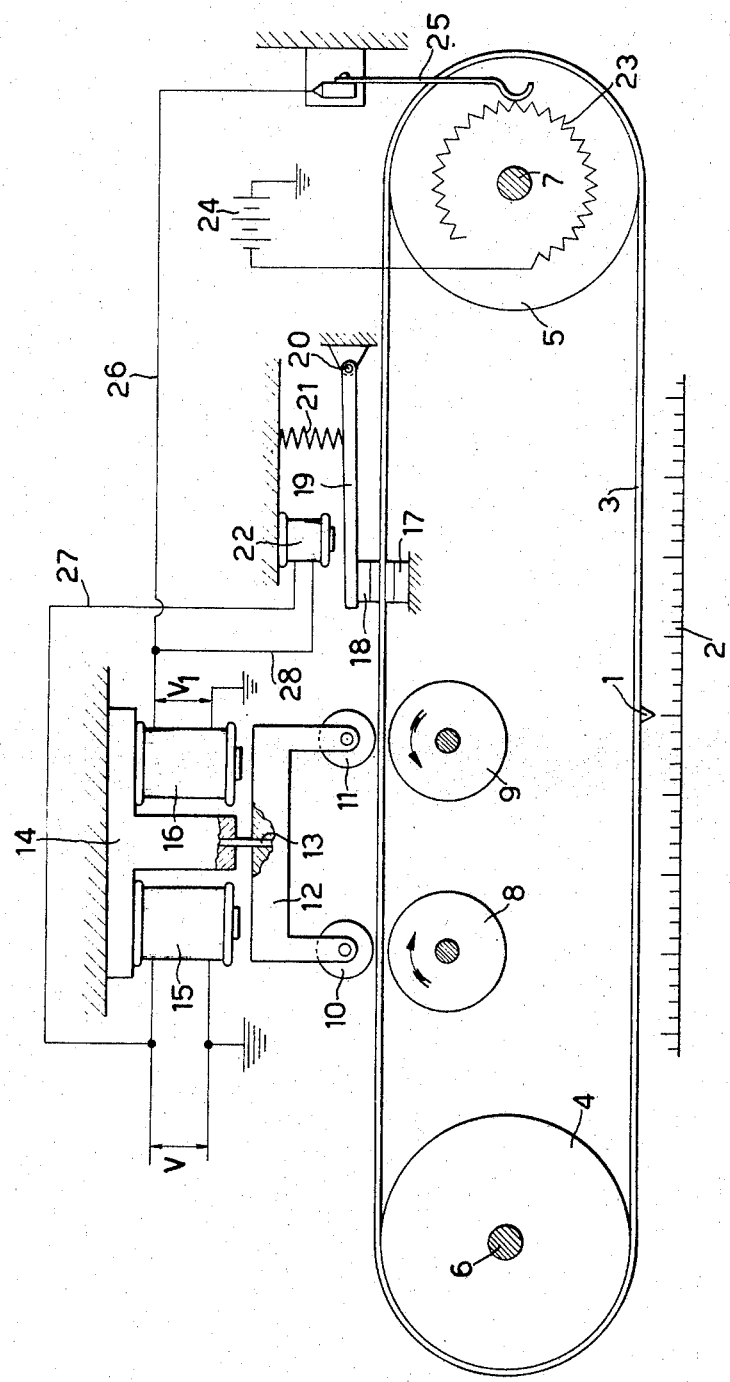

United States Patent Office 3,480,861
Patented Nov. 25, 1969

3,480,861
DEVICE FOR INDICATING THE VALUE OF A MAGNITUDE SUCH AS AN ELECTRIC SIGNAL ON A VISIBLE SCALE OR DIAL
Mario Possati, Via Stalingrado 11, Bologna, Italy
Filed Oct. 27, 1966, Ser. No. 590,036
Claims priority, application Italy, Nov. 5, 1965, 24,543
Int. Cl. G01r 17/06
U.S. Cl. 324—99                2 Claims

ABSTRACT OF THE DISCLOSURE

A device indicating the value of a magnitude on a scale by an index in which a flexible element carrying the index is supported for free movement with a minimum of friction in either of two opposite directions and a driving unit having two surface portions steadily moving in the vicinity of two surface portions of the flexible element parallel to either possible direction of motion of the last mentioned surface portions is provided. There is also included means for transversely displacing the flexible element into frictional engagement with either of the first mentioned surface portions with such means being actuated by an electric current set up by a difference between the magnitude to be indicated and a magnitude depending upon the position of the flexible element.

---

The present invention relates to a device for indicating the value of a magnitude, e.g. an electric signal on a visible scale or dial, which can have any desired length; more particularly the invention relates to an indicating device in which an index supporting member is caused to move along a scale or dial by either of two permanently moving driving means when its position has to be changed in either direction.

It is an object of the present invention to provide a device as hereinbefore specified, in which no frictional motion takes place between the index or any part connected thereto and the driving means when the index is at rest.

A further object is to provide means for engaging said index supporting member with either of said driving means which first indicated means have a very little inertia so that the position of the index on the dial can be shifted with great rapidity and sensitivity.

In the German Patent 1,100,991 it has been already proposed to move a flexible element of magnetic material stretched between two pulleys rotating in opposite directions, either of which is magnetized when the flexible element has to be moved in either direction for indicating an electric magnitude which is balanced by an opposite magnitude depending upon the position of the index.

In such a device, however, the flexible element is steadily in frictional engagement with the two pulleys, which impairs the accuracy of the indication and causes a certain wear of the flexible element and the pulleys with a consequent shortened life of the apparatus.

Summary of invention

The present invention is directed to a device for indicating the value of a magnitude on a scale by means of an index which comprises a flexible tape supported for free movement in a closed circuit with a minimum of friction in either of two opposite directions, an index carried by the flexible tape, a driving unit including two spaced driving rollers rotatable in opposite directions located adjacent one side of the flexible tape, means for generating an electric current set up by a difference in magnitude to be indicated and a magnitude depending upon the position of the flexible tape, two loose rollers located on the side of the tape opposite to the driving rollers for transversely displacing the flexible tape into frictional engagement with either of the driving rollers actuated by said generating means, and brake means located externally of the index and flexible tape operative only each time the index is close to the equilibrium position.

Brief description of the drawing

The sole figure is a diagrammatic view, partly in elevation and partly in cross-section of an embodiment of the invention.

Detailed description of the invention

An index 1, movable along a fixed scale 2, is carried by a flexible element 3, such as a tape, which is stretched about two pulleys 4 and 5. The pulleys are mounted for loose rotary movement on axles 6 and 7 respectively, and the axles are fixed to a stationary casing of the apparatus not represented in the drawing.

8 and 9 represent two rollers which are driven to rotation in direction of the arrows by any suitable motor not represented; the rollers are placed very near to the tape 3, so that the distance between their periphery and the tape is, for instance, a fraction of a millimeter.

Immediately in front of the rollers 8 and 9, on the opposite side of the tape 3, two smaller rollers 10 and 11 are carried by a yoke member 12 which is elastically hinged, for instance, by means of a thin blade 13, on a support piece 14 fixed to the casing. The rollers 10 and 11 are loosely mounted on the yoke member 12, so that they can freely rotate on their own axes.

When the yoke member 12 is at rest, i.e. not displaced against the elastic reaction of the blade 13, the rollers 10 and 11 are both very close to the tape 3 and may even be in contact therewith.

The yoke member 12 is made at least in part, of ferromagnetic material and is under the influence of two electromagnets 15, 16 which are energized in a manner to be explained hereinafter and the positions of which are symmetrical with respect to the plane of the blade 13. As a consequence, when the two electromagnets 15, 16, which are equal to each other, are energized by equal electric currents, their action on the yoke member 12 does not displace the latter from its rest position; when, however, one of the electromagnets 15, 16 is energized more than the other, the yoke member 12 is caused to tilt with respect to the support piece 14 and, as a consequence, one of the rollers 10, 11 is forced toward the corresponding driving roller 8, respectively 9, pinching the tape 3 therebetween, so that the latter is caused to move in either direction as being dragged by the one of the rollers 8, 9.

17 and 18 are two jaws of a brake for the tape 3; the jaw 17 is fixed to the casing on one side of the tape, while the jaw 18 is carried on the other side of the tape by arm 19 pivoted on a fixed fulcrum 20 and connected to one end of a spring 21 having its other end fixed to the casing; the spring acts on the arm 19 so as to press the jaw 18 carried thereby against the tape 3 which in turn rests on the jaw 17 as being slightly bent toward the latter by the pressure exerted by the jaw 18.

The arm 19 is of ferromagnetic material and can be acted upon by an electromagnet 22 fixed to the casing; when the electromagnet 22 is energized, it attracts the arm 19 thereby overcoming the action of the spring 21 so as to move the jaw 18 away from the jaw 17, whereby the tape 3 is released from the jaw 17 due to its own tension and does not even contact the jaw 18.

The pulley 5 carries (or otherwise moves) a potentiometer diagrammatically shown at 23 which is fed by an electric source 24 and yields through a contact 25 a voltage $V_1$ which depends on the angular position of the pulley 5 and, therefore, on the position of the index 1 along the scale 2.

The electric voltage is fed through a conductor 26 to the coil of the electromagnet 16, while the coil of the electromagnet 15 is fed by a voltage V which represents, or is proportional to, the magnitude to be indicated by the index 1. The coil of the electromagnet 22 is fed by the difference of voltage $V-V_1$ through conductors 27 and 28.

In the operation of the device described hereinabove, when the voltage V is different from the voltage $V_1$, the electromagnet 22 is energized and the jaws 17, 18 are opened to release the tape 3 which is thus free to move; at the same time one of the electromagnets 15, 16 is energized more than the other, whereby the yoke member 12 is tilted and one of the rollers 10, 11 presses the tape 3 on one of the rollers 8, 9 which thus drags the tape 3 to motion causing at the same time the rotation of the pulley 5 and the displacement of the potentiometer 23, which involves a variation of the voltage $V_1$.

The directions of rotation of the rollers 8 and 9 are so arranged as to cause the variation of the voltage $V_1$ to decrease the difference between $V_1$ and V. When this difference becomes zero, that is $V_1$ is equal to V, no more current passes through the coil of the electromagnet 22, whereby the spring 21 is allowed to close the jaws 17, 18 constituting the brake, while the two electromagnets 15, 16 are equally energized and their forces are balanced, whereby the yoke member 12 returns to its rest position and the tape 3 is no longer pressed on either of the driving rollers 8, 9.

The position of the index 1 along the scale 2 indicates therefore the value of the voltage V. This indication is extremely rapid and accurate because the energy depending upon a variation of the voltage V must only cause very small displacements of the yoke member 12 and of the arm 19 which can both have a very small inertia, whereas the longitudinal displacement of the tape 3 is performed by either of the rolls 8, 9, which are kept steadily running at a constant speed.

The pulleys 5, 6 can be very light and can be supported on their axes with negligible friction. The presence of the jaws 17, 18 is useful to stop the tape 3 exactly in its position corresponding to $V=V_1$, thus preventing possible oscillations before the position of equilibrium is reached.

The electric circuit has been represented in a simple form for sake of clarity, but obviously in practice it will include amplifying circuits in order to obtain indications through an electric signal of very small power.

An important advantage of the device described hereabove is that the tape undergoes no frictionally sliding movements; this involves absence of wear and a long-lasting service.

The device according to the invention can take many forms other than that described with reference to the drawing. For instance, in place of the two rollers 8, 9 a single roller can be provided having a diameter slightly less than the distance between the two flights of the tape, with the rollers 10 and 11 being then on opposite sides of the single roller. The tape 3 may be replaced by any other flexible element, such as for instance a thin disc, and the rollers 10 and 11 are so arranged as to bend the edge of such disc slightly and press it against a rolling surface having the same function as the rollers 8, 9. If desired in connection with particular uses, the jaws 17, 18 providing the brake 1 may be omitted.

I claim:
1. A device for indicating the value of a magnitude on a scale by means of an index, comprising a flexible tape supported for free movement in a closed circuit with a minimum of friction in either of two opposite directions, an index carried by said flexible tape, a driving unit for tape including two spaced driving rollers rotatable in opposite directions located adjacent one side of the flexible tape, means for generating an electric current set up by a difference in magntiude to be indicated and a magnitude depending upon the position of said flexible tape, two loose rollers positioned on the side of the flexible tape opposite to said driving rollers for transversely displacing said flexible tape into frictional engagement with either of said driving rollers actuated by said generating means, and brake means located externally of said index and flexible tape operative only each time said index is close to the equilibrium position.

2. The device as claimed in claim 1 including a yoke member, said two loose rollers being supported by said yoke member and said yoke member being tiltable in a plane perpendicular to the rotational axes of said loose rollers.

References Cited

UNITED STATES PATENTS

| | | | |
|---|---|---|---|
| 1,178,772 | 4/1916 | Zimmerman | 324—100 |
| 1,792,319 | 2/1931 | Perkins | 324—32 |
| 2,119,607 | 6/1938 | Sterba | 346—32 |
| 2,234,573 | 3/1941 | Neumann | 324—100 XR |
| 2,847,859 | 8/1958 | Lynott | 346—32 XR |
| 2,932,785 | 4/1960 | Shovic | 324—99 XR |
| 2,939,321 | 6/1960 | Shovic | 74—1 |

FOREIGN PATENTS

| | | |
|---|---|---|
| 873,942 | 8/1961 | Great Britain. |
| 346,518 | 2/1937 | Italy. |
| 1,100,991 | 6/1961 | Germany. |

ARCHIE R. BORCHELT, Primary Examiner

E. F. KARLSEN, Assistant Examiner